United States Patent Office 2,726,308
Patented Dec. 6, 1955

2,726,308

WELDING METHOD

Lionel Cinamon, New York, N. Y.

No Drawing. Application February 13, 1952,
Serial No. 271,421

17 Claims. (Cl. 219—10)

This invention consists in a method of spot welding, wherein to a face of at least one of the sheets of metal to be welded together there is applied a thin coating of a flow-coatable suspension of a finely divided metal in a liquid dispersion of film-forming organic material in a volatile vehicle or solvent for it, the evaporation of which vehicle or solvent leaves on the sheet metal a firmly adhering skin of finely divided metal dispersed in a dry-to-the-touch, non-tacky, continuous and wholly adherent film of the organic material. The welding current is then impressed through the metal sheets with this film-coating between them.

In the large scale spot welding operations such as are currently commonly conducted as in the fabrication of parts of automobile bodies and chassis, and other automotive devices, and other large volume products of commerce requiring welding in their production and assembly, various conditions influence power consumption, output, quality, subsequent treatment, and other factors and costs involved in the production. In general, the sheets of metal to be welded must be free of dirt, scale, oxide films, grease, and other interfering, adhering foreign matter. Whenever these occur on the sheet metal, for the most part much time is spent in cleaning it preliminary to welding.

Even with the use of only the fraction of a second, for example, a third of a second as in the 20-cycle weld, during which the current is flowing to produce the heat for the weld, much power and its cost could be saved, considering the volume of work throughput, if the same result could be obtained with a still smaller fraction of a second flow of current.

The method of this invention gives advantages in the preparation of the sheet metal, power consumption, output, subsequent treatment, and other factors entering into the welding operation, its effectiveness and cost.

Considered generally, the invention involves a spot welding method which comprises applying from the liquid state, to a face of at least one of the sheets of metal to be welded together and at least on the whole of those of its areas which will be in spot welds, at least one film-coating of a flow-coatable suspension of a finely divided metal (of higher oxidation potential than the metal sheets to be welded together) in a dispersion in a liquid vehicle, readily volatile at atmospheric temperature from a thin film of the dispersion, of a film-forming organic material compatible with the metal and the liquid and drying on the metal surface to a dry-to-the-touch, non-tacky, wholly adherent, continuous film; then covering that film-coating with the other of the metal sheets to be welded together; and thereafter passing a welding current through the two sheets of metal and the film-coating between them, at the individual spots selected for welds and until sufficient metal for each spot weld has fused between the sheets.

The term "sheets" in the expression "sheets of metal" is used broadly to cover any two portions of metal that are to be welded together by spot welding. It then embraces any two metal surfaces that are lapped over one another to be spot-welded together, such as two separate sheets of metal, both of which may be entirely flat, or one or both of which may be pre-shaped to some desired specific form, to some part of which the other sheet can conform, as well as overlapped ends of a single sheet of metal as in a cylinder of any selected cross-section, as well as surfaces that are to be spot-welded butt to butt. While the method of the invention is effectively advantageously applicable with sheet steel such as is extensively spot-welded in current fabrications, it is also applicable in spot-welding other metals as well.

The suspension of finely divided metal in the dispersion of film-forming organic material in the readily volatile vehicle or solvent for it is particularly advantageously useful by having the finely divided metal with an oxidation potential greater than that of the metal or metals to be spot-welded together. Thus, at least usually the finely divided metal used can serve to remove oxygen from any slight oxide film on areas of the opposing surfaces of sheet metal to be included in spot welds. Simultaneously it can serve to reduce the extent to which oxygen might possibly combine with the metal sheet while they are being fused together, during the elevated temperature prevailing in the welding step. It may then serve, as it were, as a so-called scavenger or deoxidizing agent. Finely divided aluminum is especially effective as the finely divided metal constituent of the suspension to be used in applying the method of the invention to spot-welding sheet steel. While aluminum is also at least usually the most practicable metal to use for spot-welding steel, zinc or magnesium or some other metal of higher oxidation potential than iron can also be used, such as manganese, chromium, or cadmium, or even mixtures of these various applicable metals.

While the method of the invention is especially applicable to the spot-welding of the various iron metals as the steels, including stainless steel, it is applicable to other spot-weldable metals as well, for example, other iron group metals such as nickel, and other non-ferrous metals as copper, tin, aluminum, and also spot-weldable alloys as Monel metal, and brass, and other ferrous and non-ferrous alloys that can be spot welded. With these various other spot-weldable metals, the finely divided metal used as a constituent of the suspension applied to the sheet metal likewise is one having a higher oxidation potential than the sheet metal to be welded. Then too, the finely divided metal constituent can be a mixture or even an alloy, of metals as well as a single metal so long as the mixture or alloy is predominately of higher oxidation potential than the sheet metal to be welded. Thus the finely divided metal acts, so to speak, as an antioxidant, and as illustrated by aluminum exhibits fluxing action, serving to deoxidize the zone about the weld as well as contributing some manner of surface cleaning. Moreover, the finely-divided metal constituent need not be a filler metal for the weld. Essentially it is not a filler metal and also does not necessarily alloy with the sheet metal. It may be one that can be lost by volatilization under the high temperature prevailing while the welding is actually taking place.

The content of finely divided metal in the suspension should be below that which would no longer permit the suspension to be readily applied as a thin film by flow-coating (that is to say, by brushing, spraying, or dip) or would cause the film-coating of it applied to the sheet metal to have such poor adhesion that it would flake and peel. The metal content should not be so high as to give the suspension too high a viscosity to prevent spraying it at commonly used paint spraying pressures, namely, at at least fifteen pounds per square inch. The comminuted metal content should enable spraying at pressures at least between fifteen and sixty p. s. i. Thus, while the suspension generally needs at least about one percent of the finely divided metal to exhibit adequately its electrical conductivity characteristics that are advantageous in the spot-welding method of the invention, at least usually the content of finely divided metal ought not to exceed an upper limit of about twenty percent. A good working range, at least with aluminum, is from about five percent to about fifteen percent, with a most effective content at about ten percent. These concentrations can serve as a workable guide for the other metals. The actual limit in each case will be influenced also by the viscosity contributed by the dispersion or solution of the organic material in the liquid vehicle or solvent for it, with the indication that the lower is its influence on on the overall viscosity, the nearer the content of the finely divided metal can go to the indicated maximum. In any event, the suspension should still be applicable to the sheet metal by flow-coating and be fluid enough to enable it to be sprayed under at least fifteen pounds per square inch pressure.

The particle size of the finely divided metal should be below that which would interfere with the good adherence of a film-coating applied to the sheet metal and cause it to flake and peel. For at least usually operable size it can be as much as one hundred mesh, and better at about two hundred mesh or smaller, with the average at three hundred and twenty-five mesh being strikingly effective, and an average at about four hundred mesh being especially advantageous, particularly for aluminum.

Since the relative oxidation potentials of the various metals place the metals in the same order as they appear in the electromotive series, the latter serves as a guide to the selection of a suitable metal or mixture of metals to use in a suspension, if it appeared desirable to replace aluminum in spot welding sheet steel, or in a corresponding suspension for use in spot welding some other metal or an alloy.

By a single film-coating of the suspension is meant an application by flow-coating (i. e. spraying, brushing, or dipping) the suspension (agitated uniformly to suspend the finely divided metal in the liquid vehicle), once over the sheet metal surface to deposit a uniform and continuous skin of the suspension on it. At least usually the single film-coating is one ten-thousandth to two thousandths of an inch thick and more generally about two ten-thousandths of an inch thick.

The finely divided metal is suspended in a dispersion in a liquid medium, readily volatile from a thin film of the dispersion, of a film-forming organic material compatible with the metal and the liquid and which, applied by flow-coating and after the evaporation of the liquid vehicle, dries dust-free on the sheet metal surface to a set, non-peeling, non-flaky, non-tacky, dry-to-the-touch and wholly adherent, continuous film with the finely divided metal firmly distributed in it. The term "dispersion" is used generically to include the film-forming organic material not only in true solution in a solvent for it, but also a colloidal solution or other dispersion of it in a suitable liquid vehicle that will readily evaporate. It is an advantage of the method of the invention that the film of suspension thus become dry-to-the-touch readily within about fifteen minutes, when spread out in a film-coating on the sheet metal. The resulting film-coating is then dry-to-the-touch and a hard and flexible, fixed film without putty-like plasticity because it cannot be deformed easily into any desired shape, for example, merely by pressing it with the hand or fingers.

A wide variety of film-forming organic constituent of the dispersion of the suspension can be used. It must disperse stably in, and be compatible with, a readily volatile liquid or solvent, and with the latter should be compatible with the finely divided metal. Upon being sprayed or brushed as such dispersion on to the sheet metal surface, or applied over the latter when dipped into the dispersion, the evaporation of its liquid vehicle or solvent should leave it, within about fifteen minutes, as an adherent, dry-to-the-touch, continuous film that is hard and flexible and free of putty-like plasticity. Advantageously the organic, film-forming material is a resin, that is to say, a solid or semi-solid organic compound, or mixture of such compounds, having no definite melting point or tendency to crystallize, whether natural and of vegetable, mineral or animal origin, as shellac, or the bituminous resins such as black asphalt, or the varnish resins; or synthetic. Considered among the latter are urea-formaldehyde, melamine, melamine-formaldehyde, aniline-formaldehyde, phenol-formaldehyde, phenol-furfural, glyceryl phthalate, casein, vinyl chloride, vinyl acetate, vinylidene chloride, vinyl formal, vinyl butyryl, vinyl alcohol, methyl methacrylate, polystyrene, polyamide, glyptal, rubber compound, organic polysulfide, cellulose, and silicone, and other such resins. Any such suitable resin can be used alone, or mixtures of one or more of the same or of different types can be used, so long as they are compatible with one another when dissolved in common solvents or otherwise dispersed in a suitable liquid vehicle. The synthetic resins are particularly effective.

The total resin content of the dispersion should be sufficient to hold the finely divided metal after evaporation of the solvent or liquid vehicle, in a satisfactorily set, dry-to-the-touch, dust-free, non-tacky, flexible but not permanently deformable, adhering, non-flaking, non-peeling single film-coating on the surface of the sheet metal. While about twelve to about twenty percent of total resins (based on total weight of suspension) gives a good operable range, generally with various synthetic resins, from about fourteen to about sixteen percent is particularly advantageous, especially when finely divided aluminum is the suspended metal.

By a readily volatile liquid medium or solvent is meant one that does not necessarily require heat to enable it to evaporate from a film of the suspension coated over the sheet metal, and which then can evaporate from such a coating even at atmospheric temperatures in a reasonably short time, advantageously within about fifteen minutes. Then also by a solvent, or the solvent, for the film-forming organic material or resins is not necessarily intended a single solvent, but advantageously a mixture of solvents desirably mutually soluble in one another.

It is especially effective for the vehicle or solvent to be at least primarily hydrocarbon and advantageously predominately the highly volatile aliphatic hydrocarbons such as the lower aliphatic hydrocarbons. Halogenated lower aliphatic solvents such as the chlorinated derivatives as carbon tetrachloride, the ethylene chlorides as trichlor ethylene and dichlor ethylene are effectively suitable. In some cases amounts of lower aliphatic alcohols, for example, butanol, are additionally helpful because of their ready solution of many synthetic resins. In many cases amounts of aromatic solvents, such as toluene and xylene, are effectively included. Generally, the particular amounts, and combination, of the different types of solvents to use depends on the dispersibility or solubility of the selected resins in the specific solvents and the relative volatility of the latter in relation to the time required for the film remaining, after their evaporation, to be dry-to-the-touch.

The solvent portion or liquid vehicle makes up the predominant or most prevalent constituent of the suspension, at least usually exceeding the total of the finely divided metal and the film-forming organic material, for example, the resins; and effectively being at least about half, and generally at least forty-five percent, of the total content and advantageously in the neighborhood of about three-quarters of it. The relatively low boiling petroleum fractions serve very effectively as the aliphatic hydrocarbon portion of the solvent, advantageously the fraction having a boiling range of from about 155° to 161° F.

While suitable variations may be made as to the specific content of the individual ingredients of the suspension, the method of the invention can be illustrated by, but not restricted to, the following examples:

*Example 1*

Spray over one side of a two one-hundredth inch thick sheet steel a single film-coating of a suspension containing

| | Percent |
|---|---|
| Xylol | 55 |
| Petroleum fraction (having range as just above given) | 20 |
| Modified alkyd resins | 15 |
| Aluminum power (400 mesh) | 10 | then allow the mixed solvents to evaporate from the coating until the latter does not stick to the finger; and then place over the film of finely divided aluminum dispersed in the resin film another sheet of the same size steel; and clamp the "sandwich" of the two sheets of metal with the resin film between them, between the anodes of a welding unit (having one-quarter inch tip electrodes) positioned so that the current will flow through the film as well as the metal; and then apply a welding current of 8,000 amperes until the weld is completed between the two sheets of metal.

*Example 2*

Repeat the procedure of Example 1, but replace the suspension used in it by a suspension consisting of:

¾ gallon petroleum fraction having initial boiling point 207° F., midpoint 240° F., end-point 278° F., API gravity 39, flash point (closed cup) 27° F., Kauri butanol value 79.8;

3 gallons aluminum paste (containing, by weight, 65 parts 400 mesh aluminum powder, and half of balance as mineral spirits of boiling range 310–390° F. and the other half as high flash naphtha of boiling range 305–350° F.)

¾ gallon petroleum fraction having initial boiling point 262° F., midpoint 292° F., end-point 356° F., API gravity 33, flash point 73° F., and Kauri butanol value 82.7

½ gallon "Beetle" resin solution (containing, by weight, 25% butanol, 25% xylol, 25% castor oil modified alkyd resin, and 25% butylated urea-formaldehyde resin.

*Example 3*

Repeat the steps of Example 1, but replace the suspension used in it by a suspension consisting of:

40 lbs. powdered aluminum (325 mesh)
155 lbs. terpene resin ("Piccolyte" S-115) solution (by weight 65% resin, 35% mineral spirits (as in Example 2)
24 lbs. "Falkadine" 50M-0 viscosity solution, a segregated fish oil (low iodine material removed), blown, and containing, by weight, 50% solids and 50% mineral spirits;
14 lbs. toluol;
63 lbs. petroleum fraction (boiling range 155 to 161° F.)
0.3 lb. cobalt naphthenate.

A single film-coating of this suspension applied to the sheet steel was dry-to-the-touch in about fifteen minutes.

*Example 4*

Repeat the steps of Example 1, but replace the suspension used in it by a suspension consisting of:

40 lbs. powdered aluminum (325 mesh);
155 lbs. coumarone India gum resin solution (by weight, 60% of the resin, 40% mineral spirits as in Example 2)
24 lbs. "Falkadine" 50M-0 viscosity solution (as in Example 3)
27 lbs. toluol
50 lbs. petroleum fraction (as in Example 3)
0.3 lb. cobalt naphthenate.

*Example 5*

Repeat the steps of Example 4, but in its suspension replace the coumarone India gum resin solution by the same weight of a solution containing, by weight, 60% of ester gum and 40% of the mineral spirits.

*Example 6*

Repeat the steps of Example 4, but in its suspension replace the coumarone India gum resin solution by the same weight of a solution containing, by weight, 60% Pentalyn pentaerythritol ester resin and 40% of the mineral spirits.

While in the foregoing examples and in many others merely a single film-coating of the suspension was applied, and dried in about fifteen minutes, as in Examples 1 and 2, wherever a heavier film is desired or required, more than a single film can be applied by repeating the flow-coating (i. e. spraying, brushing or dipping) one or more times over the single film. A single film is sufficient to produce the advantageous benefits of the method of the invention. However, there is no restriction against using a multiple film coating and the use of the latter is considered part of the invention.

The method of the invention is not restricted to the use of merely the specific suspensions included in the several examples. The individual resin can be replaced in any of them by any other compatible with its other ingredients, or the resin can be replaced in part by another resin or other resins, or as a whole in that way. The solvents or liquid vehicle can be varied as needed by any particular different resin. Likewise, the metal in any of them can be replaced in whole or in part by another metal or mixture of metals of finely divided alloy, so long as the content of finely divided metal is predominantly electropositive to the sheet metal to be welded. The suspensions employed in the method of the invention fills any voids in the surface of the sheet metal to be welded and enhances the degree of contact between the pair of sheets. Then also the metal content of the suspensions provides ready electrical conductivity between the sheets of metal to be welded. Without the finely divided metal content, the organic film provides undesirable, high resistance.

Thus, the method of the new invention not only contributes a saving of time in the actual welding operation, but also provides the possibility of saving time in after-treatment of the welded parts especially when they are to be lacquered or painted after having been welded. In such case, the entire area to be so treated is given a coating of the suspension before the actual weld step and the film then serves as a prime coat for the lacquer or paint, which can be applied directly to the film-coating. The extension of the film beyond the specific area of each individual spot weld provides added protection against corrosion over those areas. The solvents of the suspension, especially the hydrocarbons, provide a saving also in the pre-treatment particularly of those sheets that carry a thin film of oil or grease, for at least usually such film does not need to be cleaned separately since it is penetrated by the hydrocarbon content of the solvent of the dispersion when it is applied to the sheet metal. This is so at least for the sheet of metal to which a film of the suspension is to be applied if such film is to be applied only to one of the metal sheets to be welded together.

While the invention has been described in relation to certain specific embodiments of it, various substitutions and modifications can be made in it within the scope of the appending claims which also include equivalents of the specific embodiments.

What is claimed is:

1. The method of spot welding metal sheets, which comprises applying from the liquid state, to a face of at least one of the sheets to be welded together, and at least on those areas of that sheet, that will be in spot welds, at least a single film-coating of a flow-coatable suspension of at least about five percent of a finely divided metal, of higher oxidation potential than the metal of the sheets to be welded together, in a dispersion in at least about forty-five percent of an at least primarily hydrocarbon liquid vehicle, readily volatile at atmospheric temperature from a thin film of the dispersion, of a film-forming organic material compatible with the finely divided metal and the liquid and drying on the sheet metal surface to a dry, set, hard, fixed, non-peeling, non-plastic, non-tacky, wholely adherent, continuous film; contacting this film-coating with another of the metal sheets to be welded; and, at the spots selected for welding, passing a welding current through the two sheets of metal and the film-coating between them, until sufficient metal for the spot weld has fused between the sheets.

2. The spot welding method as claimed in claim 1, wherein the film-coating organic material contains a natural resin.

3. The spot welding method as claimed in claim 1, wherein the film-coating organic material is at least one synthetic resin dissolved in a solvent for the resin.

4. The spot welding method as claimed in claim 3, wherein the synthetic resin content is a mixture of synthetic resins.

5. The spot welding method as claimed in claim 3, wherein the synthetic resin constituent comprises a modified alkyd resin.

6. The spot welding method as claimed in claim 3, wherein the synthetic resin constituent comprises a melamine resin.

7. The spot welding method as claimed in claim 3, wherein the suspension contains from about twelve to twenty percent of the resins and the melamine resin is present to the extent of from about the total of the alkyd resins to a small excess over them.

8. The spot welding method as claimed in claim 1, wherein the liquid vehicle is a solvent for the film-forming organic material and contains at least lower aliphatic and aromatic hydrocarbons and is the most predominant constituent even up to at least three-fourths of the suspension by weight.

9. The spot welding method as claimed in claim 1, wherein the content of the finely divided metal is below that which prevents applying the suspension by flow-coating.

10. The spot welding method as claimed in claim 9, wherein the finely divided metal is from about ten to about fifteen percent by weight of the suspension.

11. The spot welding method as claimed in claim 1, wherein the sheets to be welded together are of ferrous metal and the finely divided metal in the suspension is non-ferrous.

12. The spot welding method as claimed in claim 1, wherein the sheet metal is steel and the finely divided metal consists essentially of aluminum.

13. The spot welding method as claimed in claim 12, wherein the finely divided metal is less than about twenty percent of aluminum.

14. The spot welding method as claimed in claim 12, wherein the finely divided metal is a mixture of aluminum and zinc.

15. The spot welding method as claimed in claim 1, wherein the sheet metal is non-ferrous.

16. The spot welding method as claimed in claim 15, wherein the finely divided metal is also non-ferrous.

17. The spot welding method as claimed in claim 1, wherein the finely divided metal is at least as finely divided as 100 mesh.

References Cited in the file of this patent

UNITED STATES PATENTS

| | | |
|---|---|---|
| 2,373,117 | Hobrock | Apr. 10, 1945 |
| 2,407,833 | Jablonsky | Sept. 17, 1946 |
| 2,452,805 | Sussenbach | Nov. 2, 1948 |
| 2,487,985 | Ruben | Nov. 15, 1949 |
| 2,510,727 | Sussenbach | June 6, 1950 |